INVENTOR/S
JAMES A. WILMER &
JOHN S. REYNOLDS
BY Melville, Strasser, Foster and Hoffman
ATTORNEYS

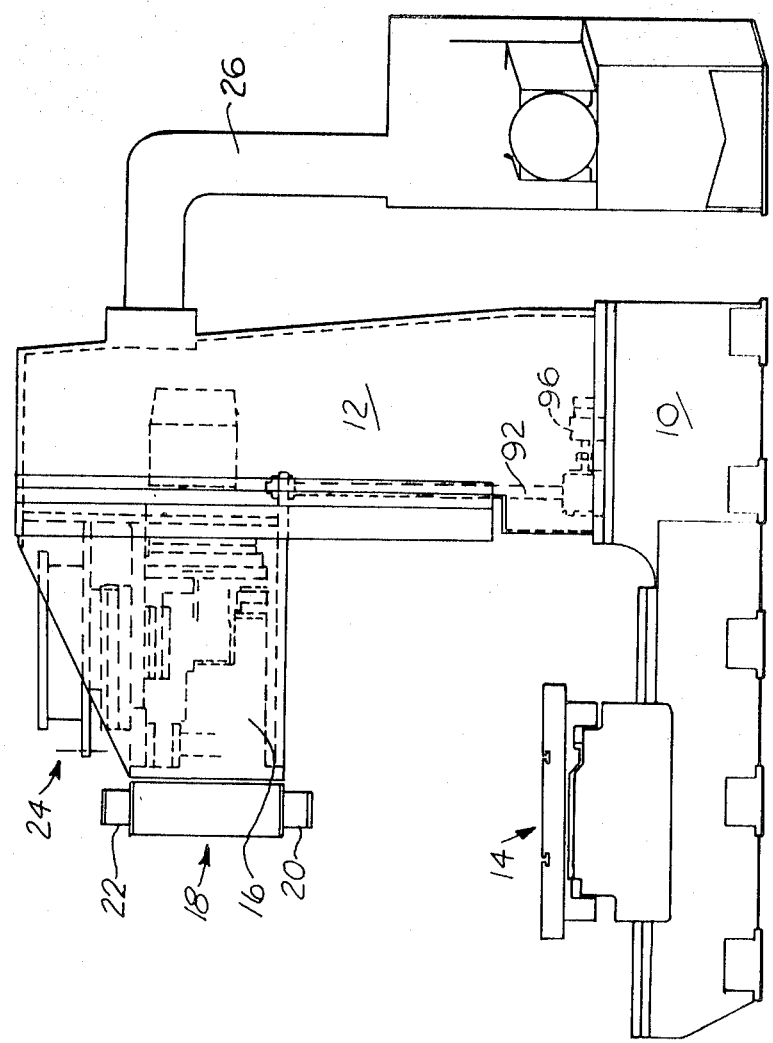

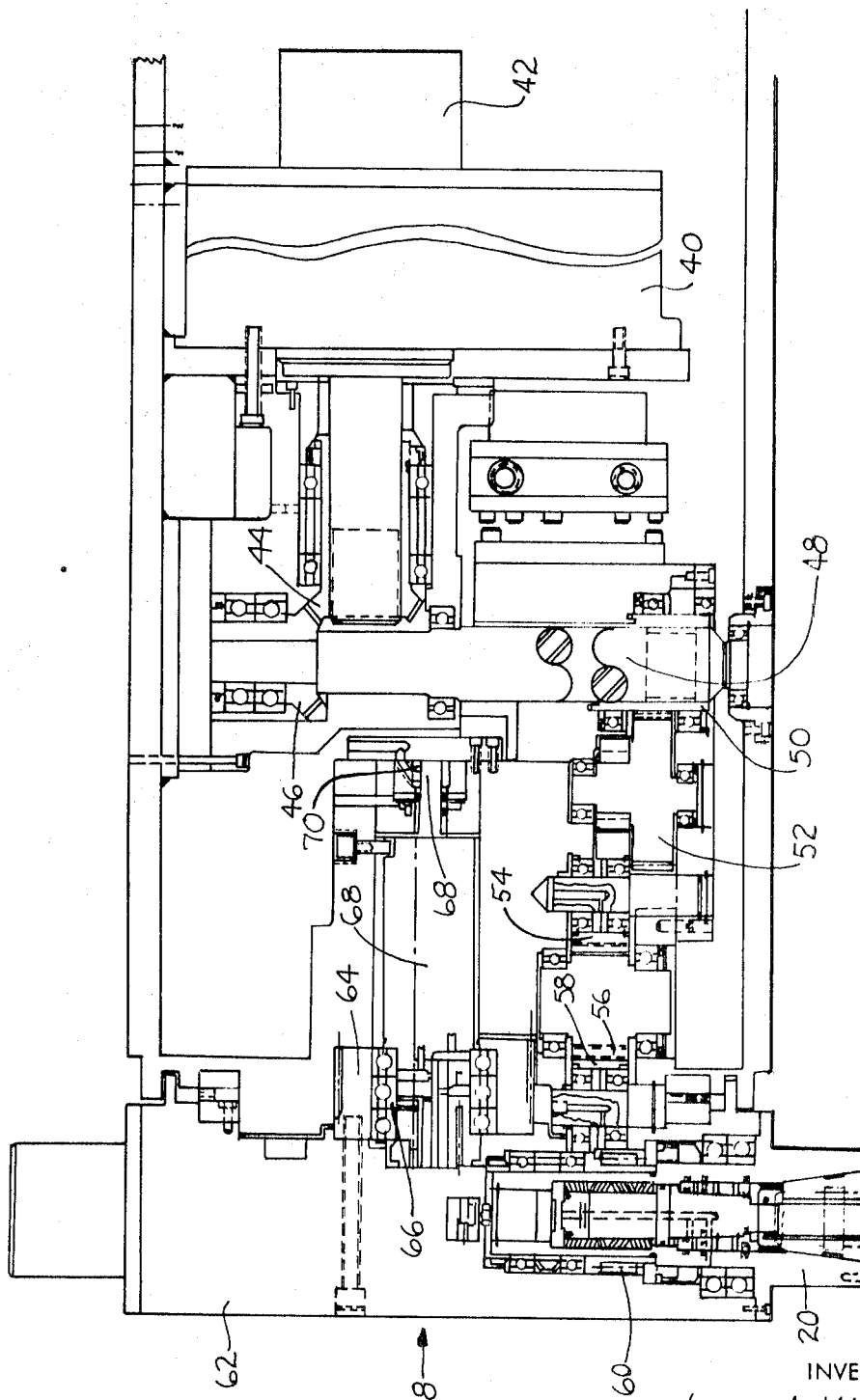

United States Patent Office 3,621,546
Patented Nov. 23, 1971

3,621,546
TOOL CHANGER FOR UNIVERSAL MACHINE TOOL
James A. Wilmer, Fort Thomas, and John S. Reynolds, Park Hills, Ky., assignors to The Notch & Merryweather Machinery Co., Cleveland, Ohio
Filed May 8, 1969, Ser. No. 823,045
Int. Cl. B23g 3/157
U.S. Cl. 29—26
8 Claims

ABSTRACT OF THE DISCLOSURE

Tool changer including a rotatable tool holding matrix movable in a path generally parallel to the axis of rotation, and also movable in a second path normal to its axis of rotation. This three way movement of the matrix is effective to load, unload and reload cutting tools in a stationary spindle.

The working spindle is carried by a reciprocable saddle which in turn carries the matrix described above.

BACKGROUND OF THE INVENTION

This invention relates to a universal machine tool adapted to perform numerous working operations, and more particularly to an improved tool changer for such a machine.

Generally considered, the so-called universal machine tool is a large industrial machine with a working spindle which can be driven at a wide range of speeds, so that many different machining operations, such as, for example, drilling, boring, reaming, tapping, and milling can be accomplished. In the ordinary course of operation, a workpiece is secured to a suitable table, and a relatively large number of machining operations may be carried out on the workpiece by moving the table. It will be obvious that if the movements of the table and cutting tool are accurate, the fact that the workpiece need not be moved between successive operations will greatly reduce set up time.

However, it will be equally apparent that in order for such a machine to successively perform two different machining operations, a change of cutting tools will be required.

Automatic tool changers are known in the prior art. For example, it is possible to provide a large capacity tool magazine or matrix from which a desired cutting tool may be selected and inserted in a working spindle. This mechanism will successively increase the versatility of the machine, but the moving arms and fingers which accomplish the tool change are complicated, expensive, and relatively slow.

U.S. Pat. 3,263,300 in the names of Schatzman and Webster and entitled Automatic Tool Change Arrangement teaches a tool changer wherein a rotatable tool magazine or matrix is movable from a retracted position to a tool change position. A working spindle carried by a turret is reciprocable in a path normal to the path of movement of the matrix. The relative movement of these elements are timed and coordinated so that for example, alternate upward strokes of the turret will be effective to place a preselected tool in the spindle, while alternate down strokes of the turret will be effective to remove a tool from the spindle.

SUMMARY OF THE INVENTION

This invention contemplates a universal machine tool having a turret which carries one or more working spindles and is movable in opposed working and return strokes. The turret itself is enlarged so that it may carry a matrix or tool magazine which is rotatable about an axis, movable in a path parallel to a spindle axis, and movable in a second path angularly related to the spindle axis. This three way movement of the matrix is effective to load, unload, and reload various preselected cutting tools in a stationary spindle.

Bearing in mind the comments set out earlier in this application, it is an object of this invention to provide a tool changer which will accomplish the tool change operation with a minimum loss of productive cutting time.

More specifically, it is an object of this invention to provide a tool changer wherein the tool change is accomplished in one spindle while another spindle is performing a working operation.

DESCRIPTION OF THE DRAWING

FIG. 1 is a side elevational view of the machine of this invention with a dotted line showing of certain of the driving components.

FIG. 2a shows the tool magazine in the starting position, FIG. 2b shows the magazine in its upper and rearmost position, FIG. 2c shows it in the upper and front position, FIG. 2d shows it down in the front position and FIG. 2e shows it back in the original position without the tool.

FIG. 4 is a cross sectional view at right angles to the section of FIG. 3 showing the spindle drive mechanism.

DESCRIPTION OF THE PREFERRED EMBODIMENT

Figure 2A:
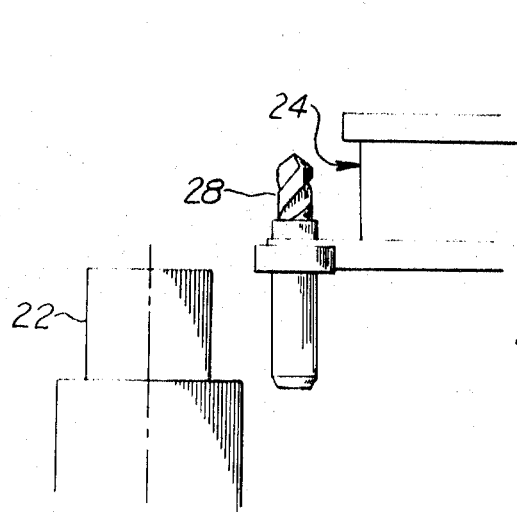
FIGS. 2a–2e are schematic views showing the operating movements utilized to accomplish the tool change operation; specifically.

Referring first to FIG. 1, the overall relationship of the components of a machine embodying this invention will be described. The machine generally includes a base 10 having an upstanding column 12 and the work supporting surface indicated generally at 14. It will of course be understood that the work supporting surface 14 will include suitable ways and source of power so that it is movable in two directions with respect to the working spindle. The construction of the work support does not form a part of this invention and hence will not be described in detail herein.

The saddle 16 is mounted upon suitable ways for reciprocable motion on the front of the column 12. It is the reciprocable motion of the saddle 16 which moves the cutting tool in opposed working and return strokes.

Rotatably secured to the front of the saddle 16 is the turret indicated generally at 18, which carries the opposed spindles 20 and 22. It will be apparent that the spindles illustrated are identical in construction, and so arranged that when one of the spindles (for example spindle 20 in FIG. 1) is in the working position, another spindle will be in the tool change position. It will be recognized by the skilled worker in the art that in some cases, it will be desirable to provide different spindles. For example, one of the spindles can be a heavy duty milling spindle while another might be a high speed boring spindle.

Mounted on top of the saddle 16 is the tool magazine indicated generally in FIG. 1 at 24. This tool magazine is mounted for rotation about its central axis, for sliding movement from a retracted position to a tool change position, and for sliding movement in a path parallel to the axis of the spindle in the tool change position.

The conduit 26 encloses the electrical and hydraulic connections for operating the machine.

Turning now to FIGS. 2a through 2d, the tool change sequence will be described. In each of these figures, the spindle 22 is in the tool change position. In FIG. 2a, the tool magazine 24 is in the retracted and down position. As will be explained in more detail hereinafter, the tool magazine accommodates a plurality of different cutting tools; for present purposes the tool 28 shown in the magazine is to be delivered to the spindle 22.

Figure 2C:
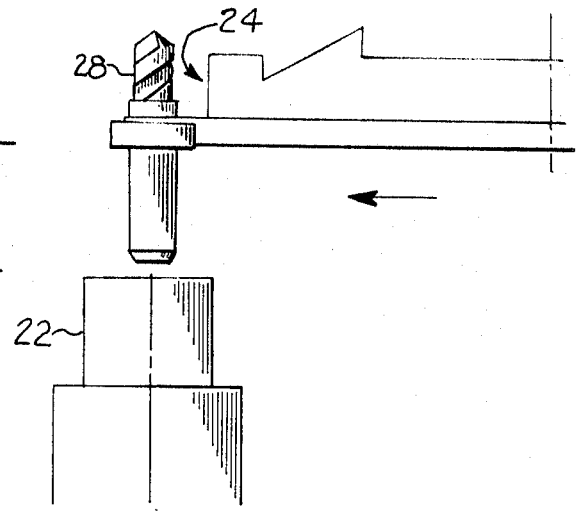
Figure 2B:
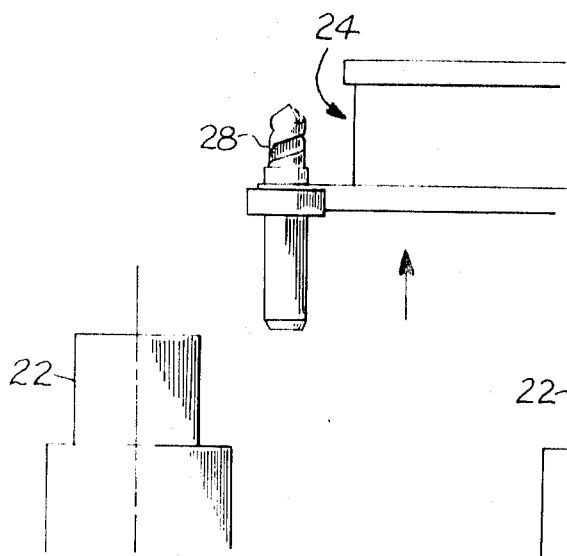

As seen in FIG. 2b, the tool magazine 24 is moved vertically to the position shown. It will be noted that it is still in the retracted position.

The magazine 24 is then moved to its tool change and up position as seen in FIG. 2c, at which point the tool 28 is coaxially aligned with the spindle 22, and spaced slightly above it.

Figure 2D:
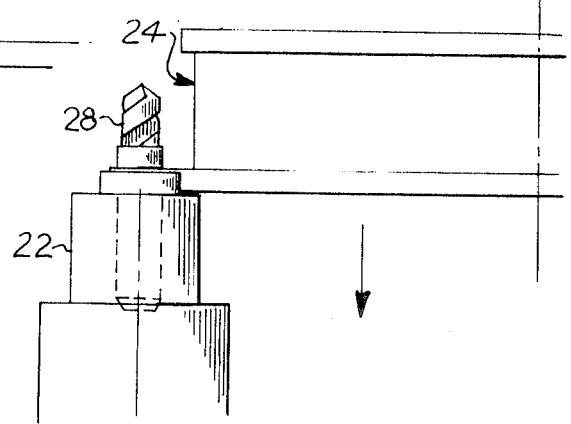

Next, as shown in FIG. 2d, the magazine 24 is lowered to its tool and change and down position, at which point the shank of the tool 28 is inserted into the collet on the spindle 22.

Figure 2E:
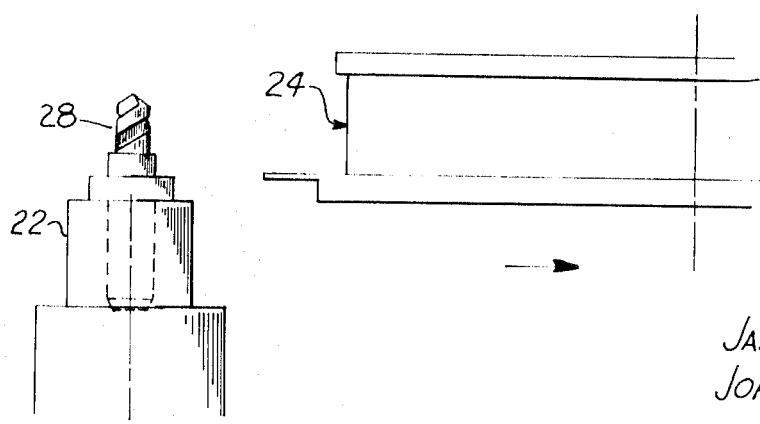

The magazine 24 then slides to its retracted and down position as shown in FIG. 2e. It should be noted that this position is the same as that shown in FIG. 2a, except that at this point the desired tool has been inserted in the spindle.

It will be apparent from the foregoing that when the tool change magazine is in the forward or tool change position, its vertical movement is effective to insert a desired tool into the spindle. By the same token, upward movement of the magazine in the tool change position will be effective to remove a tool from the spindle.

Under normal operating circumstances, a full tool change sequence will involve the removal of one cutting tool from the spindle in the tool change position, and the insertion of a new cutting tool therein. This will be accomplished by moving the magazine to the forward or tool change and down position so that it engages a tool held in the spindle, raising the magazine to its uppermost position, rotating it to bring a new tool into alignment with the spindle, lowering the magazine again to insert this new tool in the spindle, and finally sliding it rearwardly to its retracted position.

It is to be emphasized that all of the foregoing tool change sequence of operation may be carried out independently of the motion of the saddle 16. This means that the entire sequence of tool change operation can be carried out while a cutting tool in the other spindle is performing a working operation. Thus, there is virtually no loss of cutting time occasioned by the tool change operation.

It might be pointed out in passing at this time that the above cycle can be used to load and unload the tool magazine. This eliminates the need for ladders, scaffolding and the like, which would be necessary in order to reach the magazine from the floor. It will also be apparent that cutting tools in the magazine of this invention are disposed high in the air and out of the way of metal chips and the like.

Referring now to FIG. 4, the drive mechanism for the spindles will be described. Secured internally within the saddle 16 is the two speed transmission indicated at 40. The transmission itself is entirely conventional and does not form a part of this invention. Input to the transmission is from the motor indicated at 42. The output of the transmission goes through the drive train including the bevel gears 44 and 46, the shaft 48 and the gears 50, 52, 54, 56, and 58. The gear 58 is in meshing engagement with the gear 60 which is keyed or otherwise secured to the spindle 20.

As best seen in FIG. 4, the turret indicated generally at 18 includes the head portion 62. It will of course be apparent that the head portion 62, in this embodiment, includes the aligned openings which mount in suitable bearings the spindles 20 and 22 previously identified.

Suitably secured to the rear surface of the head 62 is the ring gear 64. The ring gear is rotatably journaled by means of the bearings 66 about the shaft 68 which is slidably received in the saddle 16. The right-hand end of the shaft 68 (as seen in FIG. 4) extends into the cavity 70 and includes a portion 68a of reduced diameter. The piston 72 contains a central aperture adapted to fit over the end of the shaft 68 and 68a. The piston and opening 70 together in effect form an hydraulic cylinder which may be actuated by fluid through the passage 70a and 70b to move the shaft 68 axially, and hence to move the turret head 62 toward and away from the saddle 16.

This movement of the turret head toward and away from the saddle is necessary to disengage the gears 58 and 60 and the curvic coupling to be described when it is desired to rotate the turret head 180° to reverse the positions of the spindles. It will of course be apparent that more than two spindles can be used, in which case, the turret indexing will be arranged to move each spindle sequentially to the working position.

It will of course be understood that suitable means are provided for clamping the turret head 62 against the saddle during a working operation. In the embodiment shown, this clamping action is provided by the coaction of the hydraulic cylinder formed by the piston 72 and cavity 70, and the curvic coupling seen in FIG. 4 at 74 and 76. As is well known in the art, the curvic coupling is designed to both center two ring-like elements, as well as to insure accuracy of the indexing motion. That is, because of the design of the coupling, a relatively small force in the hydraulic cylinder is effective to firmly clamp the turret head against the saddle.

Figure 5:
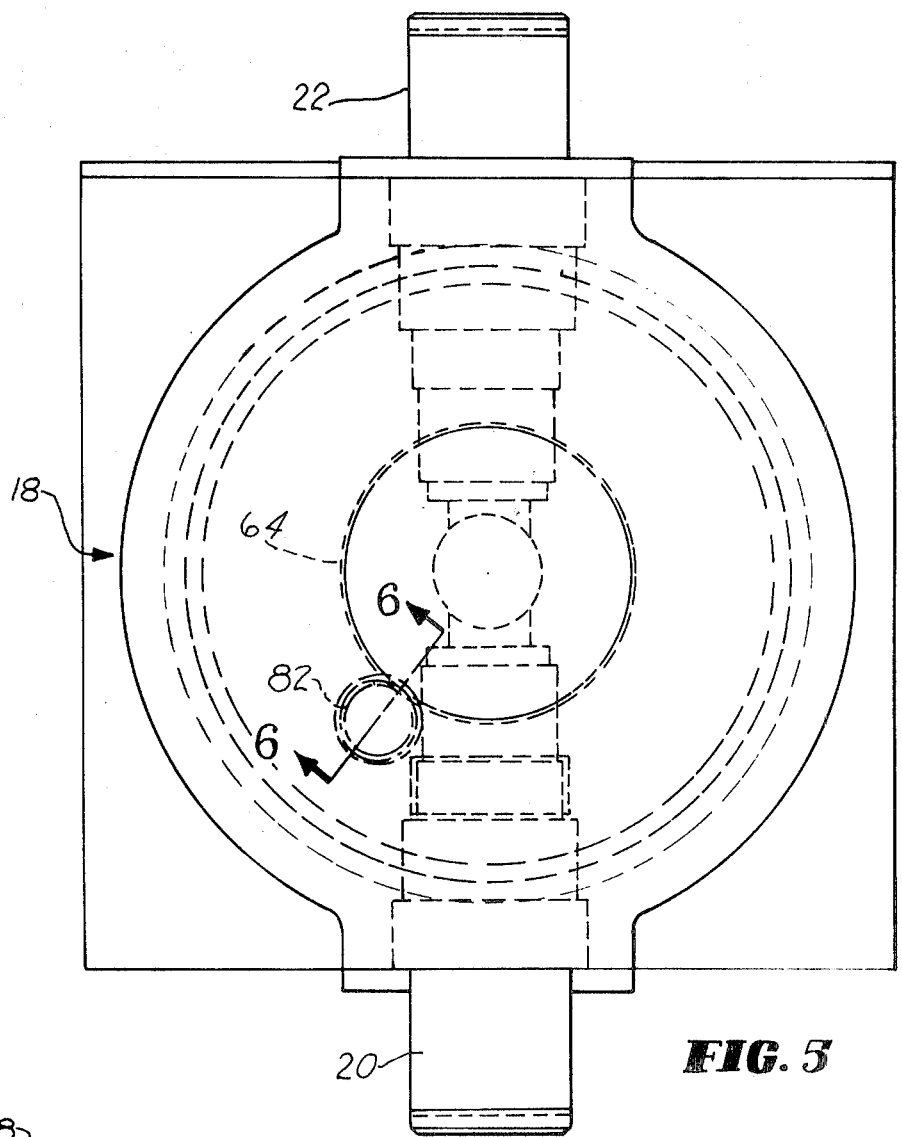
FIG. 5 is a front elevational view of the turret.
Figure 6:
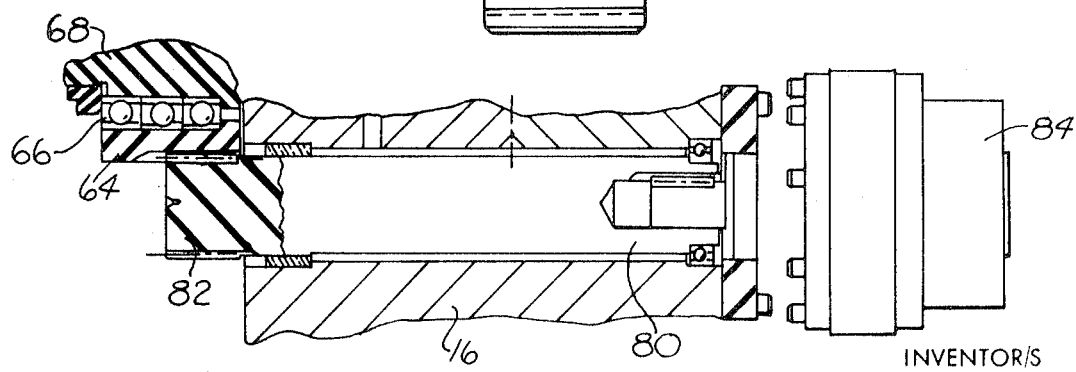
FIG. 6 is a cross sectional view along the lines 6—6 of FIG. 5 and showing the turret indexing mechanism.

Referring now to FIGS. 5 and 6, the mechanism for indexing the turret head is disclosed. It will be seen that the turret index drive shaft 80 is rotatably housed within the saddle 16. The left end (as seen in FIG. 6) of this drive shaft forms a driving gear 82 which is in meshing engagement with the ring gear 64. It will thus be apparent that rotation of the shaft 80 and gear 82 is effective to rotate the turret head 62.

The opposite end of the drive shaft 80 is suitably secured to the hydraulic motor 84.

Figure 3:
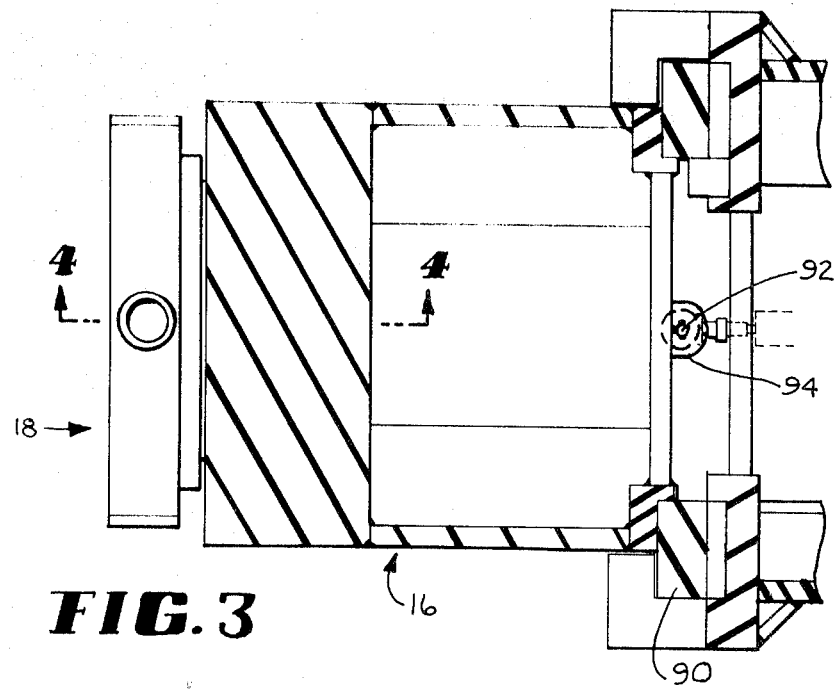
FIG. 3 is a cross sectional view through the sliding head of the device.

Referring now to FIG. 3, it will be seen that the saddle 16 is mounted for sliding motion on the column 12 by means of the ways 90. The motion along the ways is derived from the feed screw 92, one end of which is received in the internally threaded lug 94 which will be suitably secured to the saddle 16. The feed screw 92 can be driven in any conventional manner, as by the motor 96 best seen in FIG. 1.

It will of course be understood that suitable bearings will be provided for the sliding motion just described. Such way and bearing structure is entirely conventional, and hence will not be further described in this application.

Figure 8:
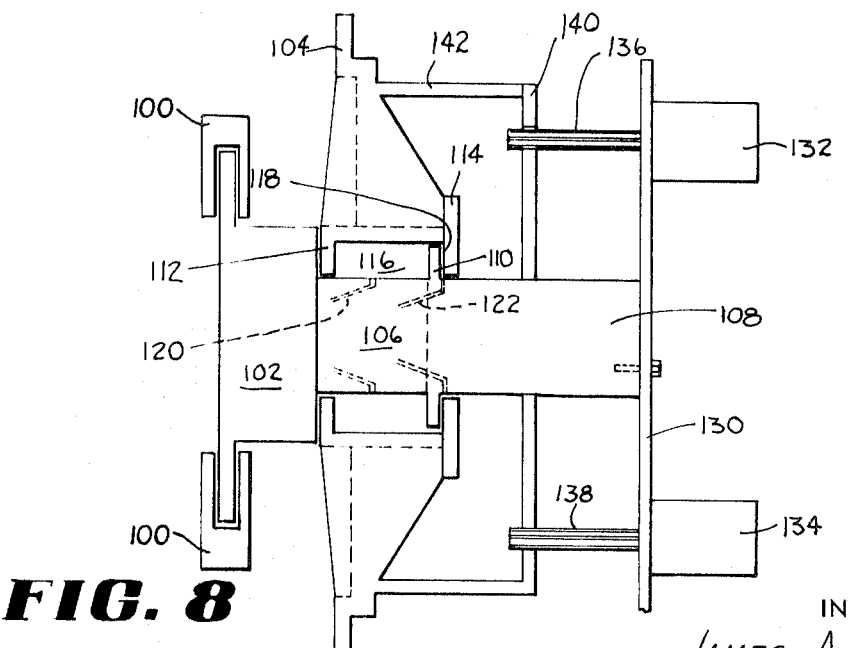
FIG. 8 is a cross sectional view along the line 8—8 of FIG. 7.
Figure 7:
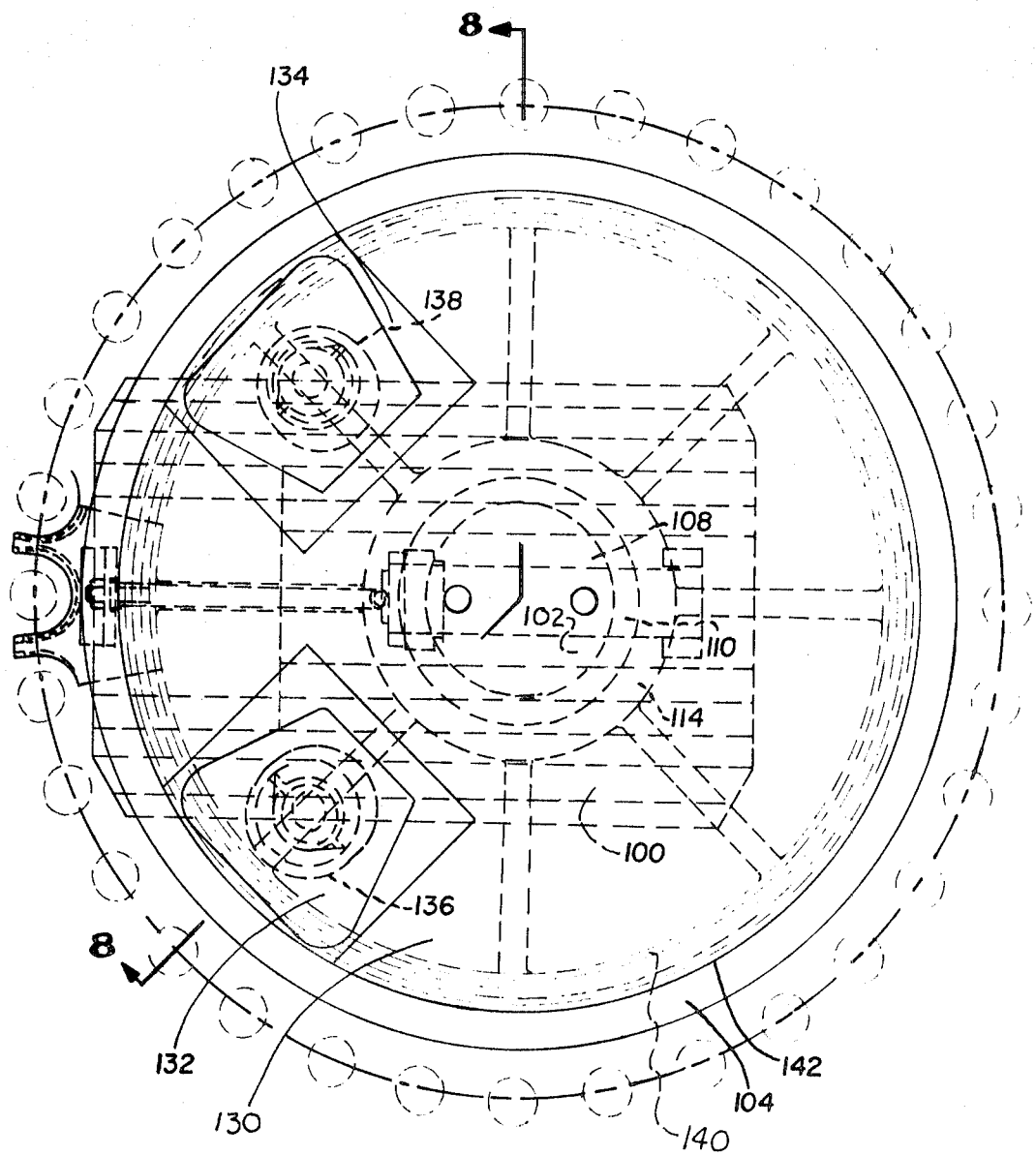
FIG. 7 is a plan view of the tool magazine.

The tool magazine or matrix indicated generally in FIG. 1 at 24 is shown in more detail in FIGS. 7 and 8. This magazine is provided with a plurality of tool compartments, each of which is designed to carry various cutting tools. The method of carrying cutting tools is substantially the same as that described in U.S. Patent 3,263,300, to which reference is made for a full disclosure.

It will be recalled that according to this invention, the tool change sequence requires that the magazine be mounted for rotation about its central axis, that the magazine be slidable in a first path of travel, and that the magazine be movable in a second path parallel to the axis of a spindle in the tool change position.

As seen in FIG. 7 the top surface of the saddle 16 is provided with the parallel ways 100, along which the central post structure 102 is slidable. It will again be understood that suitable bearings will be provided to eliminate sliding friction along these ways, and it will be understood that the sliding motion just referred to provides a path of travel for the magazine normal to its axis of rotation.

As just explained, the tool carrying disc 104 must be mounted for rotation about its central axis, as well as for motion in a path along that axis of rotation. Accordingly, as shown in FIG. 8 the central post is formed in two pieces. The lowermost piece which is slidable upon the ways 100 includes the portion 106 of reduced diameter. Fixedly secured above this portion of the central post is the portion 108, which includes at its lowermost end the outwardly extending flange 110.

The tool carrying disc 104 itself is provided with a central aperture including the lower flange 112 which is in sealing engagement with the portion 106 of the center post, and the cover plate 114 which is in sealing engagement with the top 108 of the central post.

The structure just defined (namely the flanges 110, 112, the cover plate 114) define in effect an hydraulic cylinder having the chambers 116 and 118. The passages 120 and 122 respectively provide communication for hydraulic fluid with the chambers 116 and 118.

Thus, by introducing hydraulic fluid into the chamber 116, the tool carrying disc 104 will be raised. Conversely, introduction of fluid under pressure into the chamber 118 will lower the disc 104.

Fixedly secured to the top of the member 108 of the central post is the cover plate 130, which mounts the hydraulic motors 132 and 134. As seen in FIG. 8 the shafts of the motors 132 and 134 respectively include the elongate pinion gear 136 and 138. These pinion gears are each in meshing engagement with the ring gear 140 carried by the annular flange 142 of the tool carrying disc 104.

The provision of the two hydraulic motors 132 and 134 is necessary to insure accurate positioning of the disc 104 with respect to the spindles of the machine. That is, it will be apparent that successful tool change operation requires accurate positioning of the various components. To this end, one of the hydraulic motors, for example 132, can be utilized for driving the tool carrying disc 104 in either direction of rotation. The other motor 134 can then be used to take up backlash and insure precise positioning of the disc.

While the drawings show the motors 132 and 134 as having elongated pinion gear shafts which remain in engagement with the ring gear 140 during axial motion of the tool carrying disc 104, it will of course be recognized that it would be possible to secure the cover plate 130 directly to the central post with a spline shaft or the like, so that it could move vertically along the axis of rotation of the matrix, but was constrained against relative rotation. Thus, as the tool carrying disc 104 moves up and down, the cover plate 130 would also move up and down with the gears always remaining in engagement.

It is believed that the operation of this machine will be clear from the foregoing description. Many aspects of the complete machine tool have not been described in detail herein for the reason that such components are, per se, known in the art. For example, the collets in the spindles 20 and 22 must be automatically controllable so as to clamp and release a tool holder in the proper timed relationship to the tool change sequence. A suitable chuck or collet is described in U.S. Patent 3,263,300 referred to earlier.

Numerous modifications may be made without departing from the scope or spirit of this invention, and no limitations are to be inferred or implied except as expressly set forth in the claims which follow.

The embodiments of the invention in which an exclusive property or privilege is claimed are defined as follows:

1. In a machine tool, the apparatus comprising:
   (a) a working head reciprocable in opposed working and return strokes;
   (b) means to reciprocate said working head;
   (c) a turret carried by said working head;
   (d) at least one spindle carried by said turret, said spindle having a tool change position;
   (e) a chuck for said spindle;
   (f) a tool magazine carried by said working head, said tool magazine being movable relative to said spindle in a first linear path to a tool change position, said magazine also being movable relative to said spindle in a second path, said second path being parallel to said spindle when said spindle is in said tool change position; and
   (g) means to move said magazine along said first and second paths.

2. The apparatus claimed in claim 1 wherein said turret is rotatable and including means to rotate said turret whereby to bring said spindle into and out of said tool change position.

3. The apparatus claimed in claim 1 wherein said magazine is rotatable about an axis parallel to said second path, and including means to rotate said magazine.

4. The apparatus claimed in claim 1 including two spindles carried by said turret.

5. The apparatus claimed in claim 4 wherein said spindles are parallel to each other and extend in opposite directions, whereby when one of said spindles is in an operating position, the other of said spindles is in said tool change position.

6. The apparatus claimed in claim 1 including a plurality of tools releasably secured in said magazine.

7. The tool changer claimed in claim 6 wherein said magazine includes a plurality of tool compartments, said tools being removably secured in said tool compartments, and including means associated with each tool compartment for restraining said tool against movement in a direction parallel to said second path.

8. In a machine tool, the improved structure comprising:
   (a) a turret;
   (b) at least two spindles mounted on said turret, each of said spindles having a tool change position and a working position;
   (c) means for rotating said turret whereby when one of said spindles is in the tool change position, the other of said spindles is in the working position and vice versa;
   (d) a rotatable tool magazine having a plurality of tools removably secured therein;
   (e) means for moving said magazine relative to said spindle in a first path parallel to the axis of said one of said spindles in the tool change position and relative to said spindle in a second path substantially perpendicular to said first path; and
   (f) means for moving said turret in opposed working and return strokes, said means being independent of said means for moving said magazine whereby a tool carried by said spindle in said tool change position can be changed while a tool carried by said spindle in said working position carries out a working operation.

References Cited

UNITED STATES PATENTS

| 3,186,085 | 6/1965 | Coate | 29—568 |
| 3,186,266 | 6/1965 | Coate | 29—26 Changes |
| 3,263,300 | 8/1966 | Schatzman et al. | 29—26 |
| 3,292,235 | 12/1966 | Riedel | 29—568 X |

ANDREW R. JUHASZ, Primary Examiner

Z. R. BILINSKY, Assistant Examiner

U.S. Cl. X.R.

29—568